H. LENTZ.
VALVE.
APPLICATION FILED JAN. 27, 1915.

1,198,859.

Patented Sept. 19, 1916.
3 SHEETS—SHEET 1.

WITNESSES

INVENTOR
Hugo Lentz,
BY
Kenyon & Kenyon
his ATTORNEYS

UNITED STATES PATENT OFFICE.

HUGO LENTZ, OF BERLIN-HALENSEE, GERMANY.

VALVE.

1,198,859.   Specification of Letters Patent.   Patented Sept. 19, 1916.

Application filed January 27, 1915. Serial No. 4,606.

*To all whom it may concern:*

Be it known that I, HUGO LENTZ, a subject of the Emperor of Germany, and resident of Berlin-Halensee, Germany, have invented certain new and useful Improvements in Valves, of which the following is a specification.

My invention relates to improvements in valves, and more particularly in valves of that class, in which a valve casing is provided with inlet and outlet passages and a chamber for the valve plug extends at one side through the wall of the casing to form a slot therein, and a cap is provided for closing the said slot.

The object of the improvements is to provide a valve of this class in which two screws are sufficient for holding the cap in position and for supporting the usual cross-piece which provides an upper guide for the valve stem, so that by loosening the said screws the valve can be taken apart and access can be had to the parts of the valve.

A further object of the invention is to construct the cap in such a way, that by the said screws a uniform and reliable fluid-tight joint is provided even where the valve has large dimensions, or in other words, so that even large valves can be constructed in the simple way which heretofore was possible only in small valves.

With these objects in view my invention consists in providing a concave cap which is fitted on the valve casing between opposite ribs provided on the casing, and holding the said cap in position by means of two screws which pass through bores made in the valve casing and having their tops formed to provide supports for the ends of the cross-piece.

For the purpose of explaining the invention two examples embodying the same have been shown in the accompanying drawings, in which the same letters of reference have been used in all the views to indicate corresponding parts.

Figure 1:
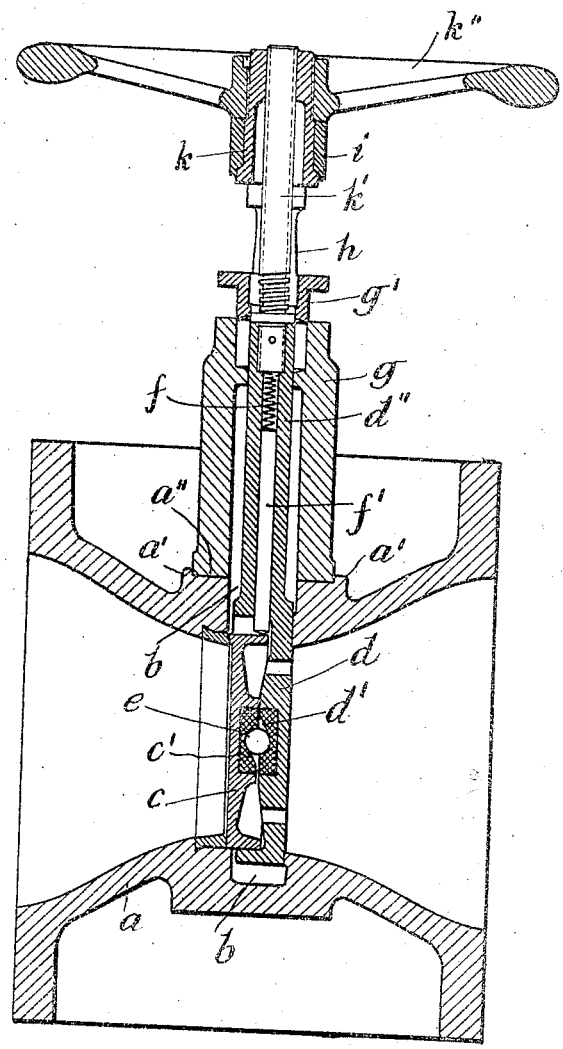
Figure 2:
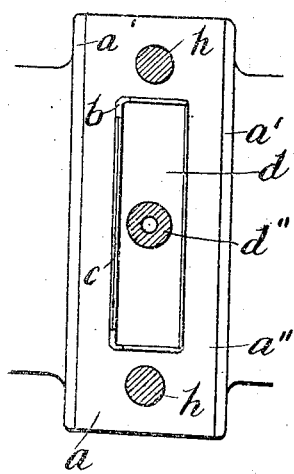
Figure 3:
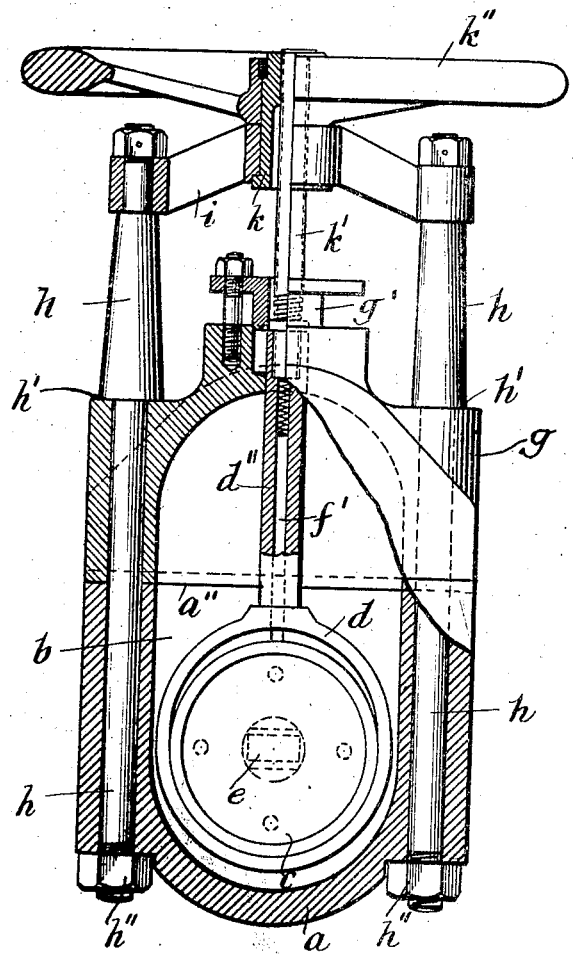
Figure 4:
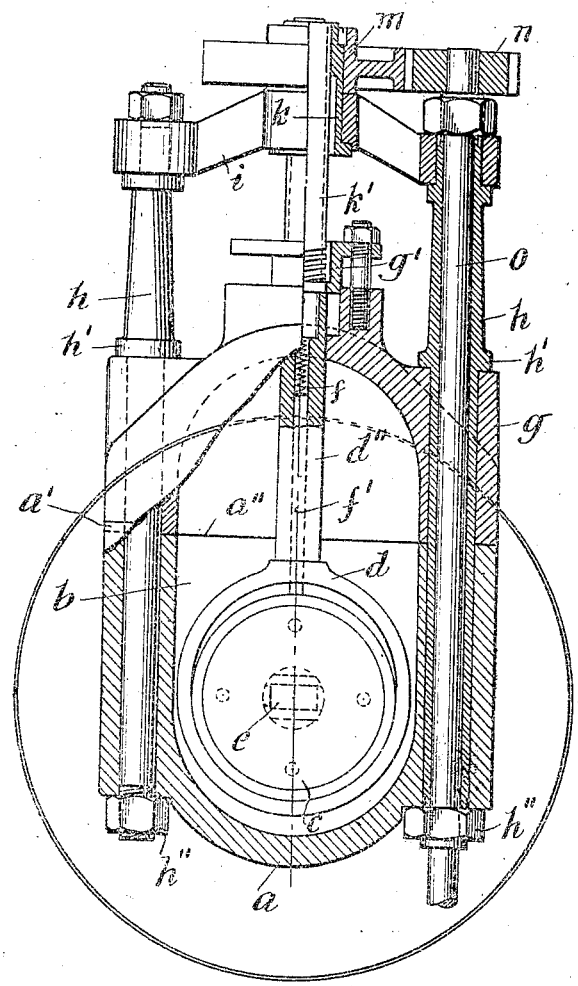

In said drawings—Figure 1, is a longitudinal section of the valve, Fig. 2, is a plan view of the seat of the cap of the valve, Fig. 3, is a cross-section of the valve, and Fig. 4, is a cross-section similar to that shown in Fig. 3, and showing a modification of the invention.

Referring to the example illustrated in Figs. 1 to 3, the valve casing $a$ is formed with a chamber $b$ which extends upward and through the top wall of the casing so as to provide therein an elongated transverse slot. Within the chamber $b$ a valve plug is located which as shown consists of two plates $c$ and $d$ placed near together and having their adjacent faces formed with cavities $c'$ and $d'$, each of which has one sloping wall. In the said cavities a roller $e$ is confined. One of the plates is made integral with a stem $d''$ which extends upward within the chamber $b$ and is formed with a longitudinal bore. Within the said bore a rod $f'$ and a spring $f$ are located which act on the plate $c$ and tend to press the same downward relatively to the plate $d$.

The slot provided within the wall of the casing by the chamber $b$ is covered by a cap $g$ which is placed on a machined face of the valve casing provided around the slot and which is bordered at opposite sides by two parallel ribs $a'$ between which the cap is fitted. To provide a fluid tight joint a suitable packing medium (not shown) is placed between the cap and the machined face of the casing. The cap is secured to the casing by two screws $h$ which bear on the wall of the casing with shoulders $h'$ and extend through bores made in the casing and carry at their lower ends nuts $h''$. At their upper ends the said screws support a cross-piece $i$ which carries in a central bore a rotary nut $k$. The stem $d''$ passes through a stuffing box $g'$ provided in the cap $g$. To the stem $d''$ a screw-threaded spindle $k'$ is rigidly secured which extends through the nut $k$. To the nut $k$ a hand wheel $k''$ is secured by means of which the nut $k$ is rotated for forcing the valve plug upward or downward.

With the construction of the valve described herein two screws $h$ are sufficient for holding the cap $g$ in position. By unscrewing the nuts $h''$ the valve can be taken apart so as to permit access to the inner parts thereof, and in a similar way the parts of the valve can be united.

In Fig. 4 I have shown an example in which the valve is equipped with means for opening or closing the same from a point located at a distance from the valve. The construction of the valve is the same as has been described with reference to Figs. 1 to 3 and the same letters of reference have been used to indicate corresponding parts. The nut $k$ carries a gear wheel $m$ which is in mesh with a gear wheel $n$ keyed to the upper end of a shaft $o$. The latter is mounted in a bore of the screw $h$. By unscrewing the nuts $h''$ and removing the cap and the cross-piece the valve is taken apart, the shaft $o$ remaining within the screw $h$. The driving mechanism for the valve plug is simple in construction and reliable in operation.

What I claim and desire to secure by Letters Patent of the United States, is the following:

1. In a valve, the combination with the casing having inlet and outlet passages, and a chamber intermediate said passages and extending at one side through the wall of the casing and said casing having on its outer wall where the chamber extends through the wall a machined surface, of a valve plug within said chamber, a stem connected with the valve plug, a cap fitted on the said surface and having a concave part, said casing having bores in the wall thereof, screws passing therethrough and securing the cap to the casing and cross piece, said screws having parts coöperating therewith and supporting said cross piece, a nut mounted to rotate in said cross piece and coöperating with said stem, and means for rotating said nut.

2. In a valve, the combination with a casing having inlet and outlet passages, and a chamber intermediate said passages and extending at one side through the wall of the casing and formed on its outer wall where the chamber extends through the wall with a machined surface, of a valve plug within said chamber, a stem connected with the valve plug, a cap fitted on the said surface and between the ribs and having a concave part, said casing having bores therein, screws passing through said bores and securing the cap to the casing, one of said screws being formed with a longitudinal bore, a shaft passing through said longitudinal bore, a cross-piece secured to the tops of said screws and providing a guide for the stem, and gear wheels secured respectively to the shaft and stem.

In testimony whereof, I have signed this specification in the presence of two subscribing witnesses.

HUGO LENTZ.

Witnesses:
   WOLDEMAR HAUPT,
   HENRY HASPER.